Mar. 6, 1923.

J. W. BRYCE 1,447,293

INDICATING MECHANISM FOR TIME RECORDERS

Filed Dec. 3, 1921

Inventor
James W. Bryce
By his Attorneys
Cooper, Kerr & Dunham

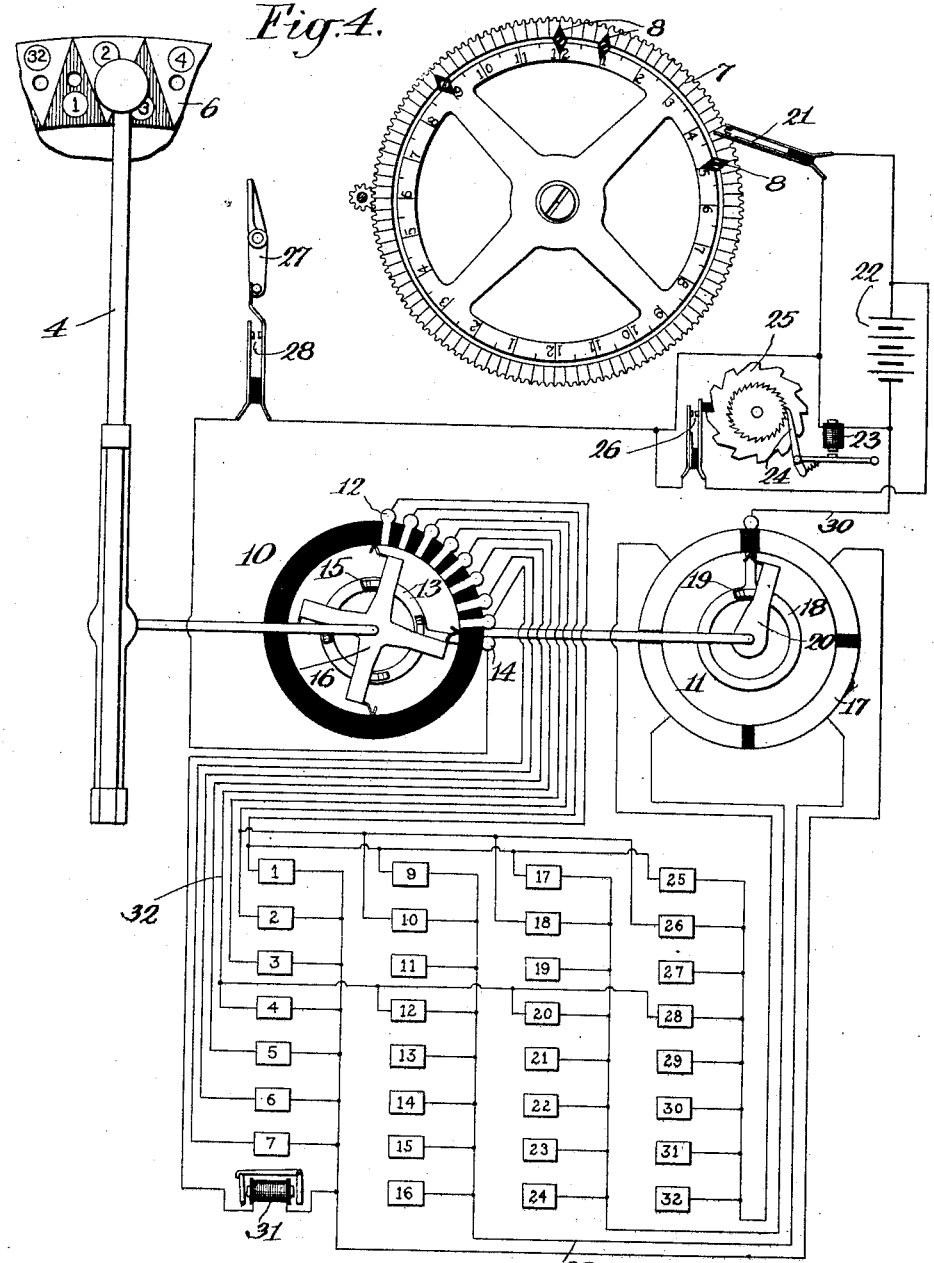

Patented Mar. 6, 1923.

1,447,293

UNITED STATES PATENT OFFICE.

JAMES W. BRYCE, OF BINGHAMTON. NEW YORK, ASSIGNOR TO THE INTERNATIONAL TIME RECORDING COMPANY OF NEW YORK, A CORPORATION OF NEW YORK.

INDICATING MECHANISM FOR TIME RECORDERS.

Application filed December 3, 1921. Serial No. 519,739.

*To all whom it may concern:*

Be it known that I, JAMES W. BRYCE, a citizen of the United States of America, residing at Binghamton, in the county of Broome and State of New York, have invented certain new and useful Improvements in Indicating Mechanism for Time Recorders, of which the following is a full, clear, and exact description.

At the present time it is ordinary practice for workmen on entering or leaving the shop or other establishment where they are employed to register the exact time of their arrival or departure. It has become desirable in many of such cases for the superintendent or other official to ascertain how many and which of the employees are late, or how many and which of them leave before the regular time, and under present conditions, this can only be ascertained by an examination of the time recorder, a proceeding that may involve some difficulty and waste of time. To avoid this and to provide a more ready means of indicating tardy arrivals or irregular attendance generally is the object of the improvement which forms the subject of my present application for Letters Patent.

According to my present plan, I provide for each time recording apparatus a device in the nature of an annunciator, and in connection with the time recording mechanism I employ means which, brought into operation by the tardy or irregular employee, drops in such annunciator a plate indicating his number, so that the foreman or superintendent by a glance at the device set near his desk, can tell at once how many and just which employees are late or otherwise irregular in coming or going from their work.

Time recording mechanisms vary widely in character, and special means may be required in cooperation with each particular form to accomplish the desired object herein contemplated, but in illustration of the principle of the invention I have selected the well known form of dial time recorder and in connection therewith I have shown in my accompanying drawing the means which I have devised for this purpose.

In said drawings hereto annexed:

Fig. 4 is a diagrammatic illustration exhibiting the circuit connections and other devices necessary for carrying out the improvement.

Figure 1:
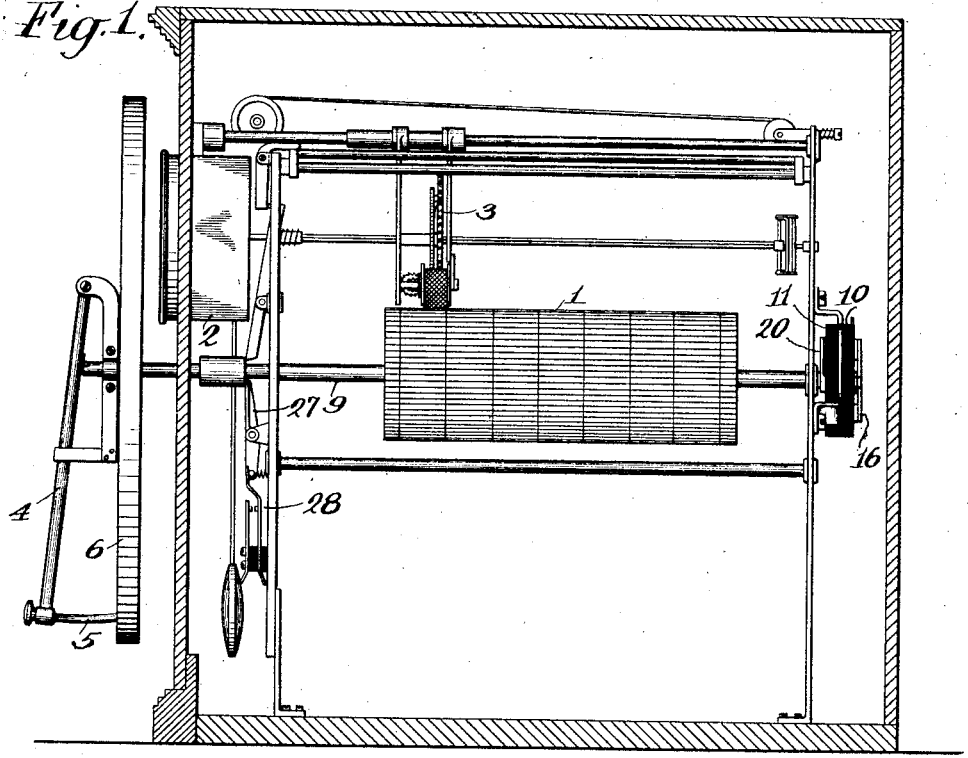
Fig. 1 is a general outline illustration of a dial type of time recorder, the case therefor being in section.
Figure 2:
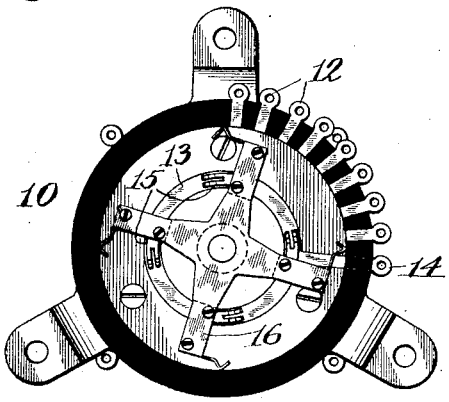
Fig. 2 is a view in elevation of a commutator device employed in the device.
Figure 3:
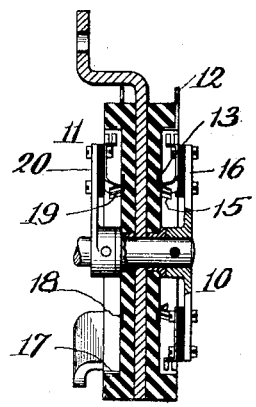
Fig. 3 is a section of the same on the line 3—3 of Fig. 2.

The time recorder is of the well known dial type, comprising a barrel or cylinder 1; A timing mechanism 2 that controls the type wheels 3; a rotary handle or lever 4 which is turned by a workman to bring a projection 5 thereon over the hole that bears his number in the dial 6, and that turns the cylinder 1 so that the workman's time will be printed by the type-wheels 3 in the ordinary way at the proper point on a sheet carried by the cylinder.

Associated with this instrument is a well known device known as a program dial 7 revolving once every twenty-four hours, which carries a number of adjustable stops 8 which are set to the proper time indicating points to close a circuit, which, in this case, for example, throws the indicating attachment into operation at say nine a. m., throws it out of operation for an hour at midday and again at 5 p. m. The purpose of this is to render the attachment inoperative to drop annunciator plates except to indicate late arrivals or early departures.

Over the end of the shaft 9 carrying the cylinder 1 and which is turned by the handle or lever 4, are two stationary commutators 10 and 11. The commutator 10 has eight contacts which is an arbitrary number of segments or contacts 12 which are grouped in one quadrant. It also has a circular contact 13 with a terminal 14 upon which bear brushes 15 carried by four equally spaced metal contacts 16, mounted on and adapted to turn with the shaft 9. The commutator 11 has four equally spaced segments 17, and a circular contact 18, over which sweeps a brush 19 carried by a single contact arm 20 mounted on the shaft 9.

Following now the operation for an understanding of the remaining parts, let it be assumed that at 9 a. m. the two contacts 21, Fig. 4, are closed by the stop 8 set for that hour. This closes the circuit of a battery or other source of current 22 through a magnet 23 that operates a pawl 24, which advances a suitably designed ratchet wheel 25 through the space of one tooth and thereby brings together two contacts 26, and maintains them in engagement as long as that one of said contacts 26 which carries a block of insulation remains on the high point of a tooth. This renders the indicating mechanism operative until 12 m., when it is thrown out for one hour.

If an employee records his time at any minute after 9 a. m., he turns the handle 4 to bring the projection 5 over the proper hole that bears his number in the dial and then pushes the handle forward to operate the recorder. In so doing he operates a lever 27 which closes two contacts 28. Having turned the handle he also turns the contact arms 16 and 20 over the commutators 10 and 11, so that one of the four contacts on arm 16 rests upon one segment or contact 12 and the single contact 20 rests on one of the four segments 17.

Let it be assumed that the employees number is 12, then one of the arms 16 will rest on the fourth segment 12 from the left and the single contact 20 will rest on the second segment 17, counting from the top center to the right. By this operation the current from the upper pole of the battery 22 will flow through the closed contacts 26 to and through the closed contacts 28 and thence to the commutator contact 14 and the four contact arms 16, through the fourth segment 12 and by a wire 32 to annunciator 12, and thence by wire 29 to the second segment 17, and thence by wire 30 back to the battery. Each annunciator operated by an electromagnet 31, will therefore show, as long as its indicator remains down, that employee 12 came late.

This explanation will serve to illustrate how any other employee, behind or ahead of time, will drop his corresponding annunciator plate to indicate that fact. I have shown eight segments 12 and four segments 17, and by these thirty-two numbers are taken care of. But these numbers are manifestly arbitrary and a lesser or a greater number of either, or both, may obviously be used. The direct purpose of this arrangement is to save wiring, for it is manifest that by direct wiring each number hole in the dial might operate its appropriate annunciator plate.

The advantage of this device is that if an annunciator be placed near the desk of the foreman or other official, he may tell at a glance how many and who are coming in late or leaving ahead of time, and having ascertained this he may reset the annunciator for the next period.

What I claim is:

1. The combination with a workman's time recorder of an annunciator, and means in the recorder actuated by the time recording mechanism and operative only during working hours, to drop the annunciator plates corresponding to and exposing the numbers of those workmen who operate the time recording mechanism during such working hours.

2. The combination with a workman's time recorder, of an indicating attachment and means for rendering the same operative only during working hours, of an annunciator having plates numbered to correspond with the workmen's numbers, and adapted to be operated by the recording mechanism to indicate the numbers of those workmen who operate the time recording mechanism during such working hours.

3. The combination with a workman's time recorder, of an indicating attachment and means for rendering the same operative only during working hours, of a circuit closer, operated by the mechanism which records the workmen's in and out times, an annunciator with electro-magnets to drop its plates, and expose the numbers of those workmen who operate the time recording mechanism and circuits including such magnets which are closed by said circuit closer through the means that record the workman's time during working hours.

4. The combination with a workman's dial time recorder, of an indicating attachment and means for rendering the same operative only during working hours, an annunciator, circuits including the annunciator plate magnets, and means operated by the time recording mechanism for closing the annunciator circuits corresponding to the number of those workmen who operate the time recording mechanism during working hours.

5. The combination with a workman's dial time recorder having a rotary recording handle, of an indicating attachment comprising two commutators, one with an isolated group of segments or contacts and a plurality of contacts rotating with the handle, the other with equally spaced segments and a single contact rotating with the handle, a circuit closer operated by the time recording mechanism, an annunciator and circuits through the two commutators including the annunciator plate magnets adapted to be closed by the time recording mechanism so as to drop the annunciator plates corresponding to the numbers of all workmen who operate the time recording mechanism during working hours.

6. The combination with a workman's dial time recorder, and an annunciator with plates corresponding to the workmen's numbers of two selective commutators operated by the time recorder, one having a plurality of segments or contacts in a certain arc, and the other as many segments as the number of said arcs required to make a complete circle, contacts to the same number sweeping the segments of the first named commutator and a single contact sweeping the other, circuits through the two commutators including the annunciator plate magnets, a circuit closer common to all the annunciator circuits operated by the recording mechanism, and means for closing a break common to such circuits during working hours only.

In testimony whereof I hereto affix my signature.

JAMES W. BRYCE.